United States Patent
Kanai (10) Patent No.: US 8,861,021 B2
(45) Date of Patent: Oct. 14, 2014

(54) INSTALLATION METHOD, INSTALLATION PROGRAM AND COMPUTER-READABLE RECORD MEDIUM

(75) Inventor: Naoki Kanai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1216 days.

(21) Appl. No.: 12/212,996

(22) Filed: Sep. 18, 2008

(65) Prior Publication Data

US 2009/0083729 A1    Mar. 26, 2009

(30) Foreign Application Priority Data

Sep. 25, 2007   (JP) ................. 2007-246748

(51) Int. Cl.
   *G06F 3/12*   (2006.01)
   *G06F 9/44*   (2006.01)
   *H04N 1/00*   (2006.01)

(52) U.S. Cl.
   CPC ............ G06F 3/1225 (2013.01); G06F 9/4411 (2013.01); H04N 1/00498 (2013.01); G06F 9/4448 (2013.01); G06F 3/1204 (2013.01); H04N 1/0035 (2013.01); G06F 3/1284 (2013.01); H04N 1/00973 (2013.01); H04N 2201/0082 (2013.01); H04N 1/00204 (2013.01)
   USPC .............. 358/1.9; 358/2.1; 717/168; 348/462

(58) Field of Classification Search
   USPC ........................ 717/168–178; 358/1.13–1.15
   See application file for complete search history.

(56) References Cited

U.S. PATENT DOCUMENTS

| | | | | |
|---|---|---|---|---|
| 5,165,014 A | * | 11/1992 | Vassar | 358/1.13 |
| 5,293,466 A | * | 3/1994 | Bringmann | 358/1.15 |
| 5,432,935 A | * | 7/1995 | Kato et al. | 719/320 |
| 5,533,176 A | * | 7/1996 | Best et al. | 358/1.18 |
| 5,561,744 A | * | 10/1996 | Sugaya et al. | 358/1.13 |
| 5,794,052 A | * | 8/1998 | Harding | 717/178 |
| 6,525,831 B1 | * | 2/2003 | Evans, IV | 358/1.15 |
| 6,535,933 B1 | * | 3/2003 | Takayama et al. | 710/14 |
| 6,603,565 B1 | * | 8/2003 | Scheidig et al. | 358/1.13 |
| 6,816,271 B1 | * | 11/2004 | Takahashi | 358/1.13 |
| 7,061,636 B2 | * | 6/2006 | Ryan et al. | 358/1.15 |
| 7,554,679 B2 | * | 6/2009 | Une et al. | 358/1.1 |
| 2002/0010806 A1 | * | 1/2002 | Yamade | 709/327 |

(Continued)

FOREIGN PATENT DOCUMENTS

| | | | |
|---|---|---|---|
| EP | 1484671 A | | 12/2004 |
| EP | 1691540 A | | 8/2006 |
| JP | 2000-353065 A | | 12/2000 |

*Primary Examiner* — Lewis A Bullock, Jr.
*Assistant Examiner* — Tina Huynh
(74) *Attorney, Agent, or Firm* — Panitch Schwarze Belisario & Nadel LLP (57) ABSTRACT

An installation method, an installation program and a computer-readable record medium are supplied. In that, in order to install driver of a printing apparatus which supports a plurality of language to a host computer, steps of obtaining corresponding language information of the driver from a language storing section; obtaining corresponding language information of operation panel of the printing apparatus from the language storing section; selecting a language for installing the driver on the basis of the corresponding language information of the driver and the corresponding language information of the operation panel; judging whether the selected language is contained in the corresponding language information of the operation panel; installing the driver on the basis of the selected language; and setting the selected language as a language of the operation panel if the selected language is judged to be contained in the corresponding language information of the operation panel in the judging step, are executed.

8 Claims, 10 Drawing Sheets

(56) References Cited

U.S. PATENT DOCUMENTS

| | | | |
|---|---|---|---|
| 2003/0093768 A1* | 5/2003 | Suzuki | 717/100 |
| 2003/0115302 A1* | 6/2003 | Teraoaka et al. | 709/221 |
| 2003/0225821 A1* | 12/2003 | Wanda | 709/201 |
| 2004/0085570 A1* | 5/2004 | Sfaelos et al. | 358/1.15 |
| 2004/0210841 A1* | 10/2004 | Takahashi | 715/536 |
| 2004/0246505 A1* | 12/2004 | Oh | 358/1.1 |
| 2005/0128501 A1* | 6/2005 | Choi et al. | 358/1.13 |
| 2005/0132090 A1* | 6/2005 | Kim et al. | 710/1 |
| 2005/0162679 A1* | 7/2005 | Iguchi | 358/1.13 |
| 2006/0050289 A1* | 3/2006 | Abe et al. | 358/1.9 |
| 2006/0074627 A1* | 4/2006 | Moore et al. | 704/8 |
| 2007/0211168 A1* | 9/2007 | Ko et al. | 348/462 |
| 2007/0245346 A1* | 10/2007 | Shintoku | 717/174 |
| 2009/0303519 A1* | 12/2009 | Shimatani et al. | 358/1.15 |

* cited by examiner

| DRIVER SUPPORT LANGUAGE DEFINITION FILE | | | |
|---|---|---|---|
| LANGUAGE NAME | LANGUAGE ID | DRIVER STORAGE TABLE NUMBER | . . . |
| ENGLISH | 1 | 1 | |
| JAPANESE | 2 | 2 | |
| FRENCH | 3 | 3 | |
| ITALIAN | 5 | 5 | |
| PORTUGUESE | 6 | 6 | |

| PANEL SUPPORT LANGUAGE DEFINITION FILE | | | |
|---|---|---|---|
| LANGUAGE NAME | LANGUAGE ID | PANEL LANGUAGE RESOURCE TABLE NUMBER | . . . |
| ENGLISH | 1 | 1 | |
| JAPANESE | 2 | 2 | |
| FRENCH | 3 | 3 | |
| GERMAN | 4 | 4 | |
| ITALIAN | 5 | 5 | |
| CHINESE | 7 | 7 | |

INSTALLATION METHOD, INSTALLATION PROGRAM AND COMPUTER-READABLE RECORD MEDIUM

FIELD OF THE INVENTION

This invention relates to an installation method, an installation program and record medium that can be read by computer, for installing driver which supports a plurality of language in printing apparatus.

BACKGROUND OF THE INVENTION

In conventional installation method used for installing driver which can support a plurality of language to a host computer, user needs to be prompted to select language so as to decide driver language of printing apparatus, then, the driver whose language has been selected is installed into the host computer. In recent years, such technology used to select language displayed on a displaying section of an operation panel of the printing apparatus has also been developed. So, in order to decide the language displayed on the operation panel, the user needs to be prompted to select and decide the language. Then, in order to display the selected language onto the operation panel of the printing apparatus, the language data is downloaded to the printing apparatus. That is, the language of printer driver which controls the printing apparatus and the language which can be displayed on the operation panel of the printing apparatus are selected respectively through different steps.

It may refer to patent document 1 of Japan patent publication 2000-353065.

However, in the conventional installation method mentioned above, when the same language needs to be selected for the driver of the printing apparatus and for the operation panel, even though both the driver of the printing apparatus and the operation panel support the language, the user must set the language of driver of the printing apparatus and the language of the operation panel respectively. So the conventional method leads to a complex operation.

SUMMARY OF THE INVENTION

It is, therefore, an object of the invention to provide a driving circuit capable of solving the above problem.

A first aspect of the invention is to provide an installation method used to install driver of a printing apparatus which supports a plurality of language to a host computer, the installation method comprises steps of:

obtaining corresponding language information of the driver from a language storing section;

obtaining corresponding language information of operation panel of the printing apparatus from the language storing section;

selecting a language for installing the driver on the basis of the corresponding language information of the driver and the corresponding language information of the operation panel;

judging whether the selected language is contained in the corresponding language information of the operation panel;

installing the driver on the basis of the selected language; and setting the selected language as a language of the operation panel if the selected language is judged to be contained in the corresponding language information of the operation panel in the judging step.

A second aspect of the invention is to provide an installation program which is used to install driver of a printing apparatus which supports a plurality of language to a host computer, and enables computer to execute steps of:

obtaining corresponding language information of the driver from a language storing section;

obtaining corresponding language information of operation panel of the printing apparatus from the language storing section;

selecting a language for installing the driver on the basis of the corresponding language information of the driver and the corresponding language information of the operation panel;

judging whether the selected language is contained in the corresponding language information of the operation panel;

installing the driver on the basis of the selected language; and setting the selected language as a language of the operation panel if the selected language is judged to be contained in the corresponding language information of the operation panel in the judging step.

A third aspect of the invention is to provide a computer-readable record medium recording an installation program which is used to install driver of a printing apparatus which supports a plurality of language to a host computer, and enables computer to execute steps of:

obtaining corresponding language information of the driver from a language storing section;

obtaining corresponding language information of operation panel of the printing apparatus from the language storing section;

selecting a language for installing the driver on the basis of the corresponding language information of the driver and the corresponding language information of the operation panel;

judging whether the selected language is contained in the corresponding language information of the operation panel;

installing the driver on the basis of the selected language; and setting the selected language as a language of the operation panel if the selected language is judged to be contained in the corresponding language information of the operation panel in the judging step.

Effect of the Invention

According to the invention, when the same language is needed to be selected for the driver of the printing apparatus and the operation panel, and both the driver of the printing apparatus and the operation panel support the language, the user can complete setting of the language by designating the language once without setting the language of the driver of printer and that of the operation panel respectively. So it can avoid the complex operation of designating language respectively during installation.

The above and other objects and features of the present invention will become apparent from the following detailed description and the appended claims on the basis of the accompanying drawings.

DETAILED DESCRIPTION OF THE PREFERRED EMBODIMENTS

Embodiments of the invention will be described in detail hereinbelow on the basis of the drawings.

<Embodiment 1>

Figure 1:
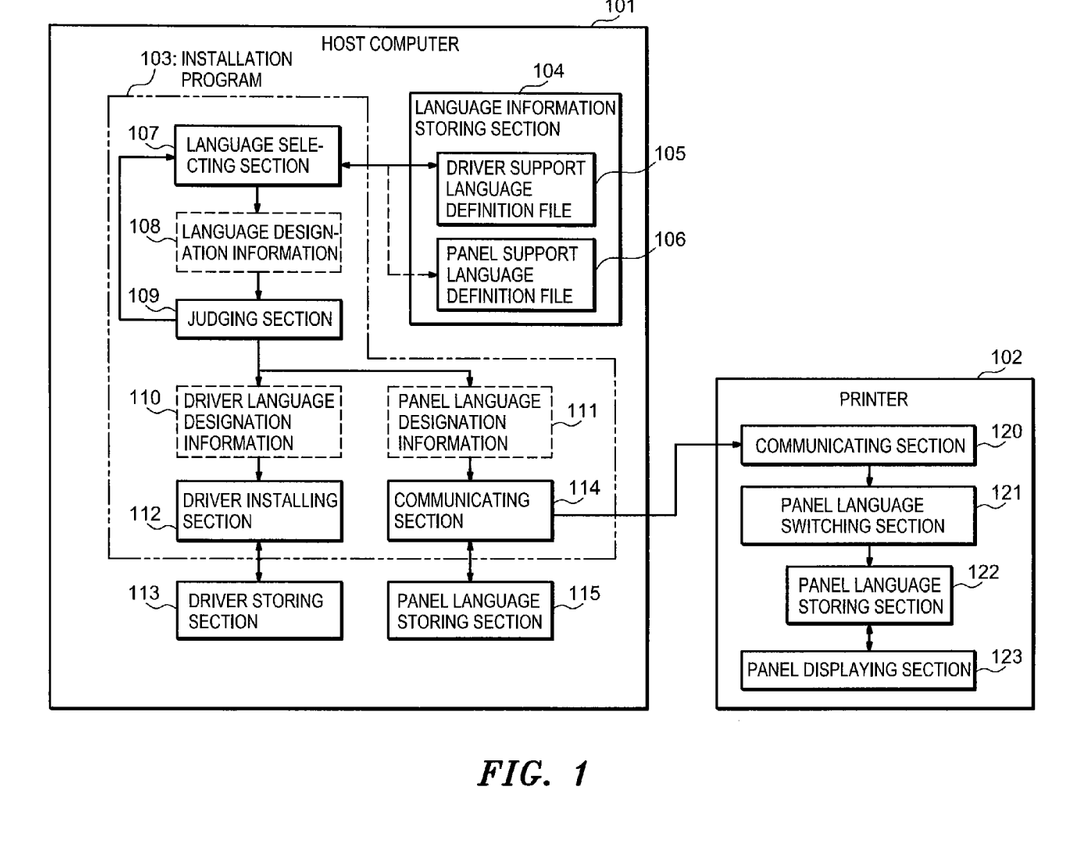
FIG. 1 is a block diagram showing a whole structure of embodiment 1.

Explanation of Structure:

FIG. 1 is a block diagram showing a whole structure of embodiment 1.

As shown by FIG. 1, a host computer 101 is connected with a printer 102.

In order to install driver of the printer 102 in the host computer 101, the host computer 101 comprises a installation program 103, a language information storing section 104, a driver storing section 113 and an panel language storing section 115.

The installation program 103 is a control program stored in HDD or the like (not shown) of the host computer 101. Through a CPU (not shown) of the host computer 101 executes a predetermined module contained in the installation program 103, a language selecting section 107, a judging section 109, a driver installing section 112 and a communicating section 114 are generated to start up as respective function blocks.

The language selecting section 107 is used to prompt user to select designation language and receive language designation information 108. The judging section 109 is used to judge whether the language designation information 108 designated by the user through the language selecting section 107 is included in two files of a driver support language definition file 105 and a panel support language definition file 106 or is only included in the panel support language definition file 106.

The driver installing section 112 is used to obtain a driver whose language is corresponding to a driver language designation information 110 from the driver storing section 113 on the basis of a results made by the judging section 109, and installs it into the host computer 110.

The communicating section 114 is used to obtain panel language which corresponds to panel language designation information 111 from the panel language storing section 115 on the basis of a result made by the judging section 109, and send it to the printer 102 as panel language setting information.

The language information storing section 104 is a memory used to store the driver support language definition file 105 and the panel support language definition file 106. The driver support language definition file 105 contains a list of support language of driver and relevant information correlating drivers of different languages such as index number. The panel support language definition file 106 contains a list of language supported by a panel displaying section 123 of printing apparatus and relevant information correlating panel language such as index value of language resource.

The driver storing section 113 is a memory used to store drivers set by languages of different countries (such as English, Japanese . . . ) to correspond to respective languages. The panel language storing section 115 is a memory used to store messages set by languages of different countries (such as English, Japanese . . . ) to correspond to respective languages.

In the embodiment, the language information records a language name just like it is. The language name can also be a number representing the language or an index value of a table storing the language name. Further, the driver support language definition file 105 and the panel support language definition file 106 may describe data in XML form. Furthermore, the driver support language definition file 105 and the panel support language definition file 106 are formed to previously couple so that the same languages is without repetition and to contain flag indicating whether the languages are supported by the driver and operation panel.

The printer 102 comprises a communicating section 120, a panel language switching section 121, a panel language storing section 122 and a panel displaying section 123.

The communicating section 120 is used to receive panel language setting information transmitted by the installation program 103 through the communicating section 114. The panel language switching section 121 is used to store the panel language in the panel language storing section 122 on the basis of the panel language setting information so as to switch the panel language. The panel displaying section 123 is used to display the panel language on the basis of the panel language stored in the panel language storing section 122.

Figure 2:
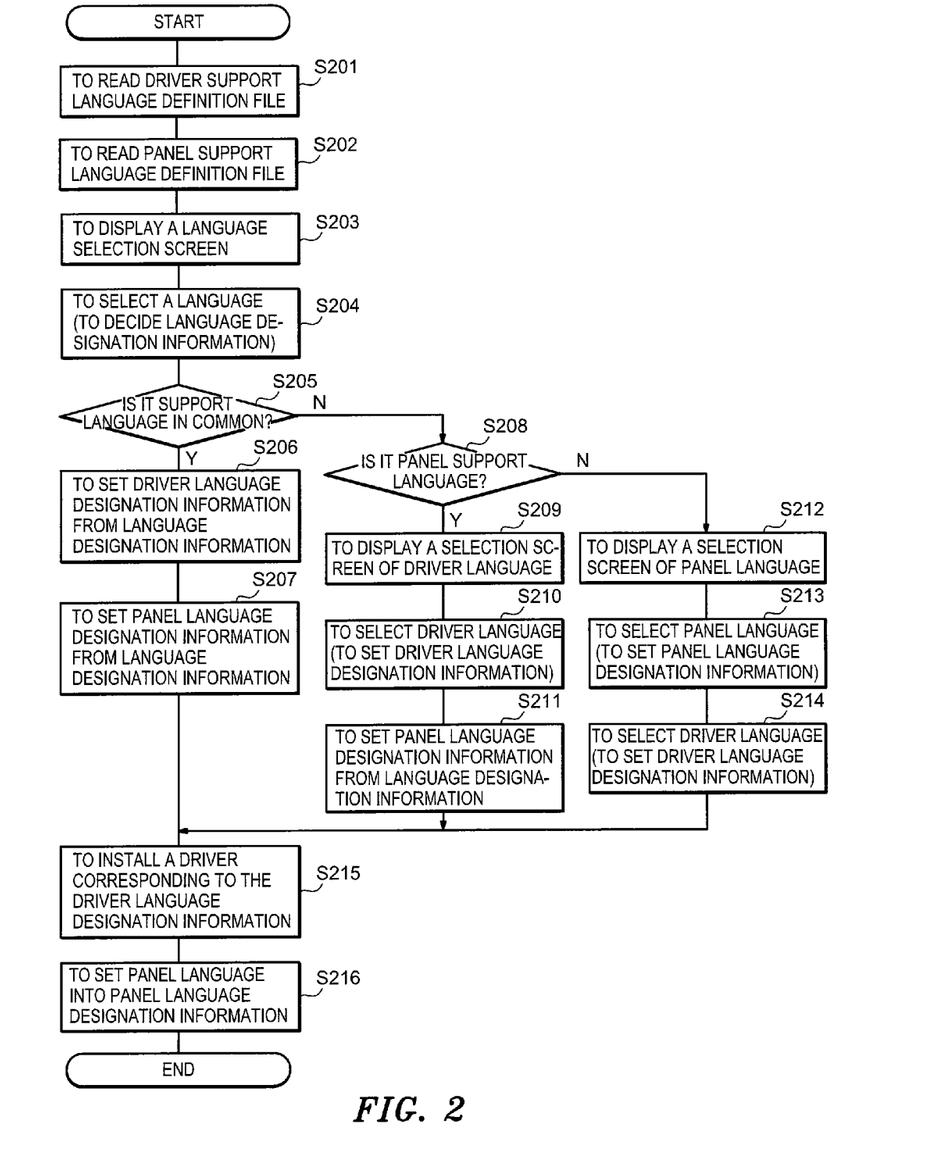
FIG. 2 is a flow chart showing operation of embodiment 1.

Explanation of Operation:

FIG. 2 is a flow chart showing operation of embodiment 1.

The following is a detailed description of embodiment 1 according to an order from step S201 to step S216 and through referring to FIG. 1.

Step S201

The installation program 103 on the host computer 101 reads out the driver support language definition file 105 from the language information storing section 104, as a preparation for the user to select language.

Step S202

The installation program 103 on the host computer 101 reads out the driver support language definition file 106 from the language information storing section 104 as the preparation for the user to select language.

Here is a description with respect to the driver support language definition file 105 and the panel support language definition file 106.

Figure 3A:
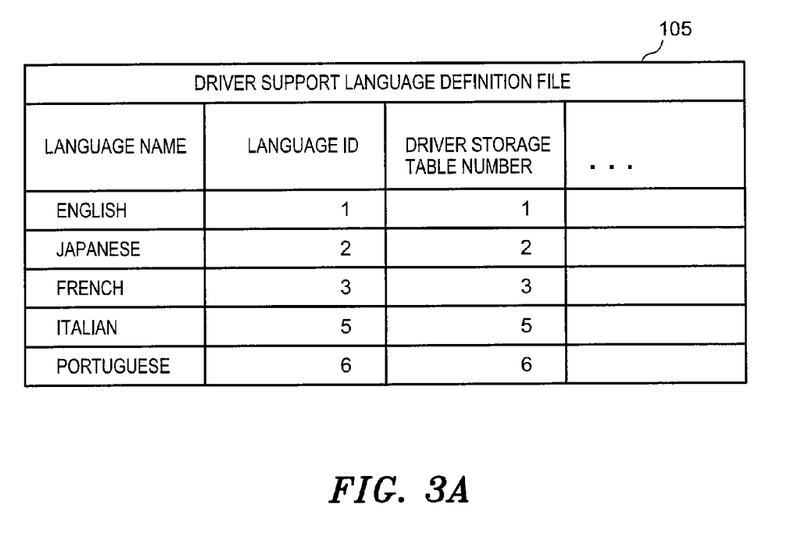
FIG. 3A is a schematic view showing driver support language information.
Figure 3B:
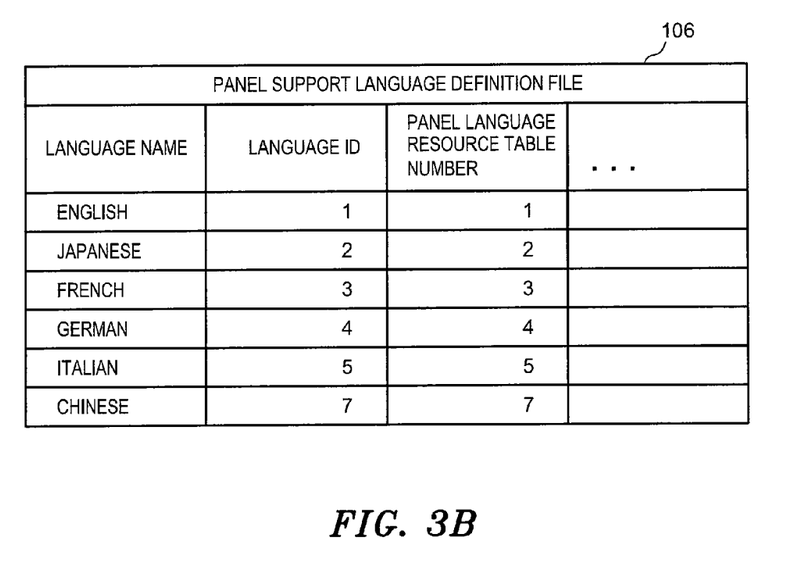
FIG. 3B is a schematic view showing panel support language information.

FIG. 3A is a schematic view showing driver support language information; and FIG. 3B is a schematic view showing panel support language information.

As shown in FIG. 3A, in this embodiment, the driver support language definition file 105 contains a list in which language name supported by driver, language ID of every language and index number correlating each driver with different language are corresponding to. As shown in FIG. 3B, in this embodiment, the operation support language definition file 106 contains a list in which language name supported by panel displaying section 123 of the printer, language ID of every language and index value correlating each language resource file are corresponding to.

Now return to FIG. 2 for further description.

Step S203

The language selecting section 107 couples the driver support language definition file 105 with the panel support language definition file 106 so as to enable the same language not to repeat, and displays a language selection screen in which language name of all languages are the options so as to prompt user to select language. The following is a description with respect to an example of selection screen.

Figure 4:
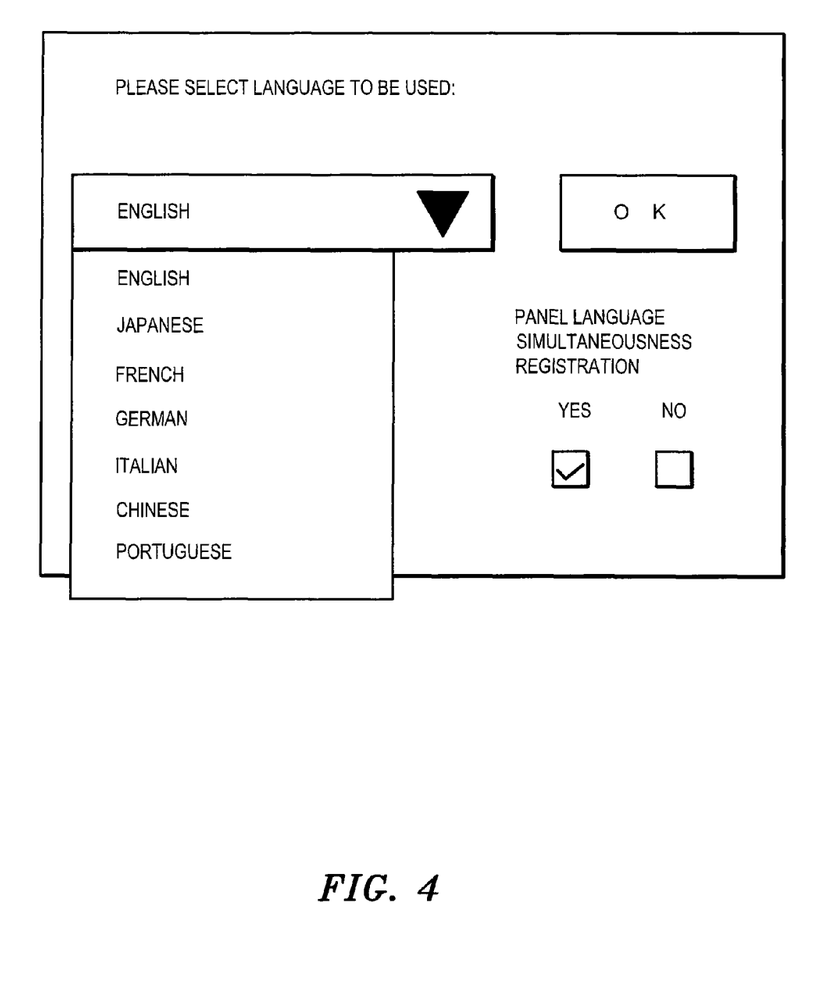
FIG. 4 is a schematic view showing language selection screen of embodiment 1.

FIG. 4 is a schematic view showing a language selection screen of embodiment 1.

As shown in the figure, respective languages are displayed on the basis of the driver support language definition file 105 of FIG. 3A and the panel support language definition file 106 FIG. 3B for making user select. In the figure, "English" is selected by user. Further, when a panel language simultaneousness registration is set into "Yes", following an installation process of driver, a selection process and a registration process of panel language are executed. When the panel language simultaneousness registration is "No", only an installation process of driver is executed.

Step S204

After the user finishes selecting the language, the language selecting section 107 sets the language ID of the selected language as the language designation information 108.

Step S205

The judging section 109 performs a comparison between the language ID set in language designation information 108 and that recorded in driver support language definition file 105 and conforms whether the same language ID exists in driver support language definition file 105. Then the judging section 109 performs a comparison between the language ID set in language designation information 108 and that recorded in panel support language definition file 106 and conforms whether the same language ID is included in the panel support language definition file 106. Thereby, it is judged whether the same language ID is contained by both of them. On condition that the language is judged to be contained by both of them, Step S206 is executed, otherwise, Step S208 is executed.

Step S206

The driver language designation information 110 is set on the basis of the language designation information 108.

Step S207

Then, the panel language designation information 111 is set on the basis of the language designation information 108.

Step S208

The judging section 109 performs a comparison between the language ID exists in the language designation information 108 and that exists in the panel support language definition file 106 and judges whether the language designation information 108 is the panel support language. On condition that the language is judged to be the panel support language, Step S209 is executed; otherwise, Step S212 is executed.

Step S209

The language selecting section 107 reads out the driver support language definition file 105 and then again makes the options of driver language for prompting the user to select the language of the driver.

Step S210

The language selecting section 107 sets the driver language designation information 110 on the basis of the information selected by the user.

Step S211

Continuously, the language selecting section 107 sets the panel language designation information 111 on the basis of language designation information 108.

Step S212

The language selecting section 107 reads out the panel support language definition file 106 and makes the options of panel language again for prompting the user to select panel language.

Step S213

The language selecting section 107 sets the panel language designation information 111 on the basis of the information selected by the user.

Step S214

Then, the language selecting section 107 sets the driver language designation information 110 on the basis of the language designation information 108.

Step S215

The driver installing section 112 obtains the driver of the corresponding language from the driver storing section 113 on the basis of the information in the driver support language definition file 105 and the panel language designation information 110, and installs it to the host computer 101.

Step S216

The communicating section 114 obtains the panel language resource of the corresponding language on the basis of the information in the panel support language definition file 106 and the panel language designation information 111; builds a language register command on the basis of the panel language setting information for language switch including the panel language resource; and sends it to the printer 102. After the communicating section 120 of the printer 102 receives the language register command, the panel language switching section 121 stores the panel language into the panel language storing section on the basis of the panel language setting information so as to switch the display language of the panel displaying section 123. Then the flow is over.

Explanation of Effect:

As disclosed above, in the installation method of the embodiment, when the same language needs to be selected for the driver and the operation panel of the printing apparatus and both the driver and the operation panel of the printing apparatus support the language, the user can complete a setting of the language by designating the language once without individually setting the language of the driver and the operation panel of the printer respectively. So it can avoid the complex operation of designating language individually during installation.

<Embodiment 2>

Figure 5:
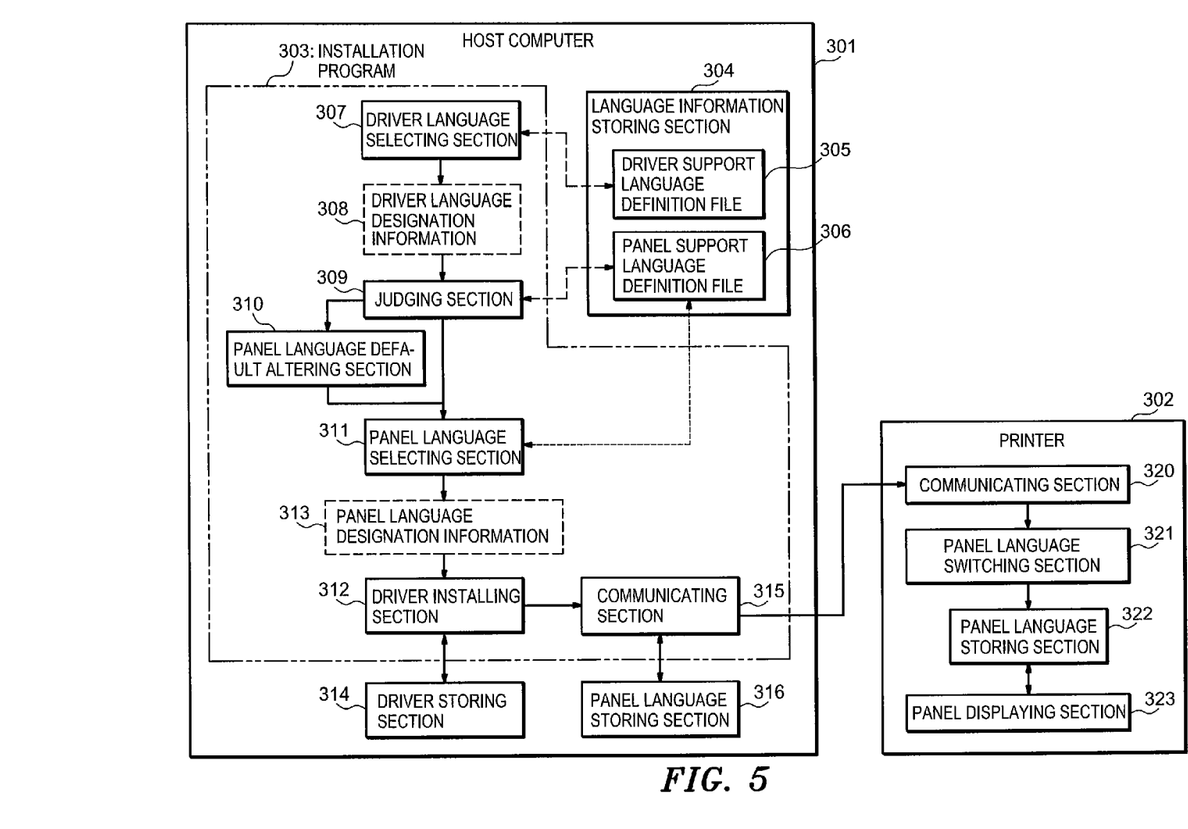
FIG. 5 is a block diagram showing a whole structure of embodiment 2.

Explanation of Structure:

FIG. 5 is a block diagram showing a whole structure of embodiment 2.

As shown in the figure, a host computer 301 is connected with a printer 302.

The host computer 301 comprises an installation program 303, a language information storing section 304, a driver storing section 314 and a panel language storing section 316 so as to install driver of the printer 302 in the host computer 301.

The installation program 303 is control program stored in HDD or the like (not shown) of the host computer 301. An execution of a predetermined module contained in the installation program 303 by the CPU (not shown) of the computer 301 enables a driver language selecting section 307, a judging section 309, a panel language default altering section 310, a panel language selecting section 311, a driver installing section 312 and a communicating section 315 to be generated to startup.

The driver language selecting section 307 is provided for prompting user to select designation language and receiving driver language designation information 308. The judging section 309 is provided for judging whether the driver language designation information 308 designated by the user through the driver language selecting section 307 is included in two files of a driver support language definition file 305 and a panel support language definition file 306) or is only included in the driver support language definition file 305.

When the judging section 309 judged that the panel support language definition file 306 includes the driver language designation information 308, the panel language default altering section 310 is provided for altering the default setting of the panel language selecting section 311 to the same language as the driver language designation information 308. The panel language selecting 311 is provided for prompting the user to select the designation language and receiving the panel language designation information 313.

The driver installing section 312 is provided for obtaining the driver whose language is corresponding to the driver language designation information 308 set on the basis of a judging result of the judging section 309 from a driver storing section 314 and for installing the driver in the host computer 301.

The communicating section 315 is provided for obtaining panel language which is corresponding to the set panel language designation information 313 from the panel language storing section 316 in accordance with a selecting result made by the panel language selecting section 311 and for sending it to the printer 302 as panel language designation information.

The language storing section 304 is a memory such as HDD or RAM used to store the driver support language definition file 305 and the panel support language definition file 306. The driver support language definition file 305 contains a list of support language of driver and contains relevant information correlating drivers of different languages such as index numbers. The panel support language definition file 306 contains a list of language supported by the panel displaying section 323 of the printing apparatus and relevant information correlating panel language such as index values of the language resource.

The driver storing section 314 is a memory used to store drivers set to correspond to languages of different countries (such as English, Japanese . . . ) according their respective languages. The panel language storing section 316 is a memory used to store information set by languages of different countries respectively (such as English, Japanese . . . ) according to their respective languages.

In the embodiment, a language name is recorded just as it is. The language name can also be number showing the language or index value of table to store the language name. The driver support language definition file 305 and the panel support language definition file 306 may describe data in XML form. Further the driver support language definition file 305 and the panel support language definition file 306 are formed to couple so that language previously is without repetition and to contain flag indicating whether the language is supported by driver and operation panel.

The printer 302 comprises a communicating section 320, a panel language switching section 321, a panel language storing section 322 and a panel displaying section 323.

The communicating section 320 is used to receive panel language setting information transmitted by the installation program 303 through the communicating section 315. The panel language switching section 321 is used to store panel language in the panel language storing section 322 on the basis of the panel language setting information so as to switch the panel language. The panel displaying section 323 is used to display the panel language on the basis of the panel language stored in the panel language storing section 322.

Figure 6:
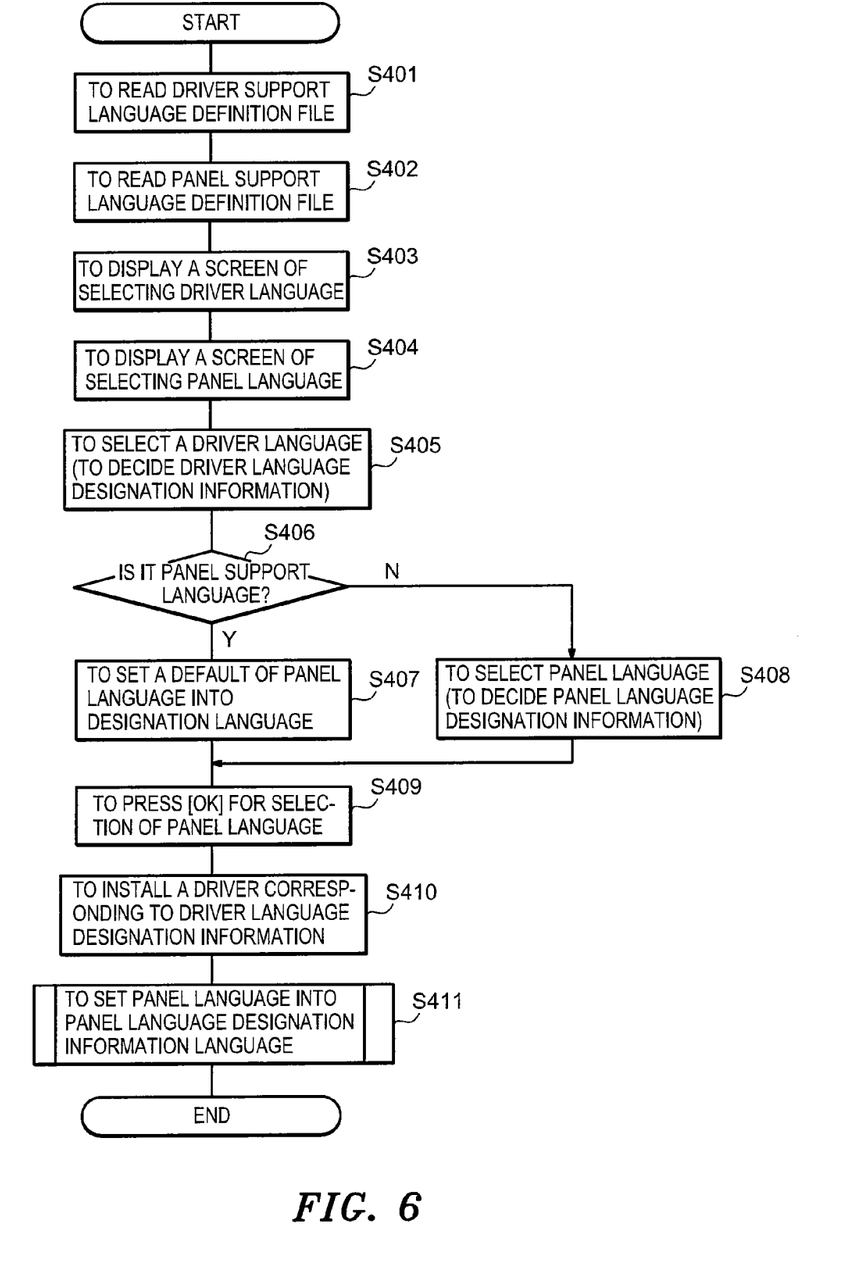
FIG. 6 is a flow chart showing operation of embodiment 2.

Explanation of Operation:

FIG. 6 is a flow chart showing operation of embodiment 2.

The following is the detailed description with respect to embodiment 2 according to an order from Step S201 to Step S216 shown in figure and through referring to FIG. 5.

Step S401

The installation program 303 in the host computer 301 reads out the driver support language definition file 305 from the language storing section 304 as the preparation for the user to select language.

Step S402

The installation program 303 in the host computer 301 reads out driver support language definition file 306 from the language information storing section 104 as the preparation for the user to select language.

An example concerning the driver support language definition file 305 and the panel support language definition file 306 is the same as embodiment 1 shown in FIG. 3A and FIG. 3B. In this embodiment, the driver support language definition file 305 contains the list of the language names of driver, the language ID of every language and the index numbers correlating the drivers of all different languages. And in this embodiment, the panel support language definition file 306 contains the list of the names of the language supported by the panel displaying section 323 of the printer, the language ID of every language and the index values correlating all language resource files.

Step S403

The driver language selecting section 307 displays the language names of the driver support language definition file 305 on a language selection screen as options for prompting the user to select language.

Step S404

The panel language selecting section 311 displays the language names of the panel support language definition file 306 on a language selection screen as options for prompting the user to select language.

Figure 7:
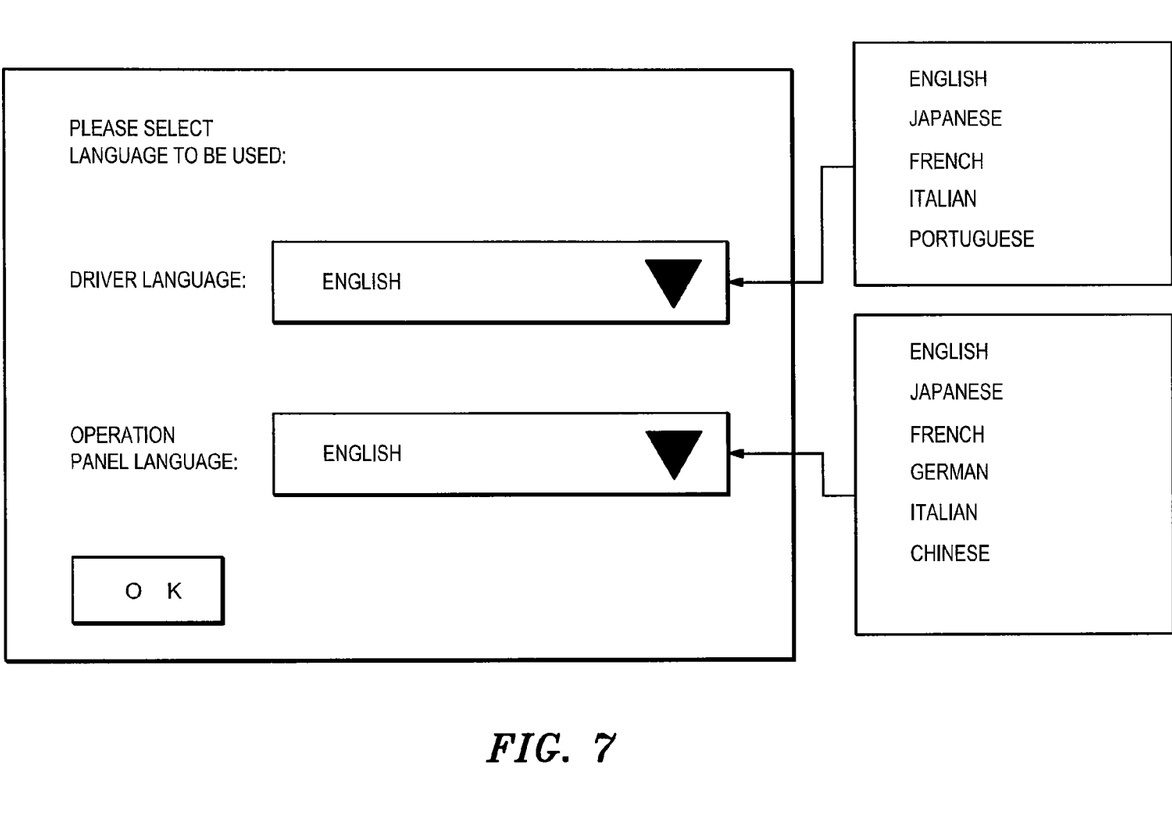
FIG. 7 is a schematic view showing language selection screen of embodiment 2 (I)

FIG. 7 is a schematic view showing a language selection screen of embodiment 2 (I).

As shown in the figure, in a selection decision frame, the language which has been selected before (herein: English) is displayed. In an optional frame, the language name is displayed on the basis of the driver support language definition file 305 and the panel support language definition file 306 that are the same as that in FIG. 3A and FIG. 3B. Here, as an example, the driver support language definition file 305 stores English, Japanese, French, Italian, Portuguese; the panel support language definition file 306 stores English, Japanese, French, German, Italian and Chinese.

Now return to FIG. 6 for further description.

Step S405

The driver language selecting section 307 sets the language ID of the selected language as the driver language designation information 308 after the user finishes selecting the language.

Step S406

When the user select to alter through the driver language selecting section 307, the judging section 309 performs a comparison between the language ID set in the driver language designation information 308 and the language ID recorded in the panel support language definition file 306; and confirms whether the panel support language definition file 306 contains the same language ID. On the condition that the same language ID is contained in it, Step S407 is executed; otherwise, Step S408 is executed.

Step S407

The panel language default altering section 310 alters a default selection of the panel language selecting section 311 automatically to the option of language name of the same language ID.

Figure 8:
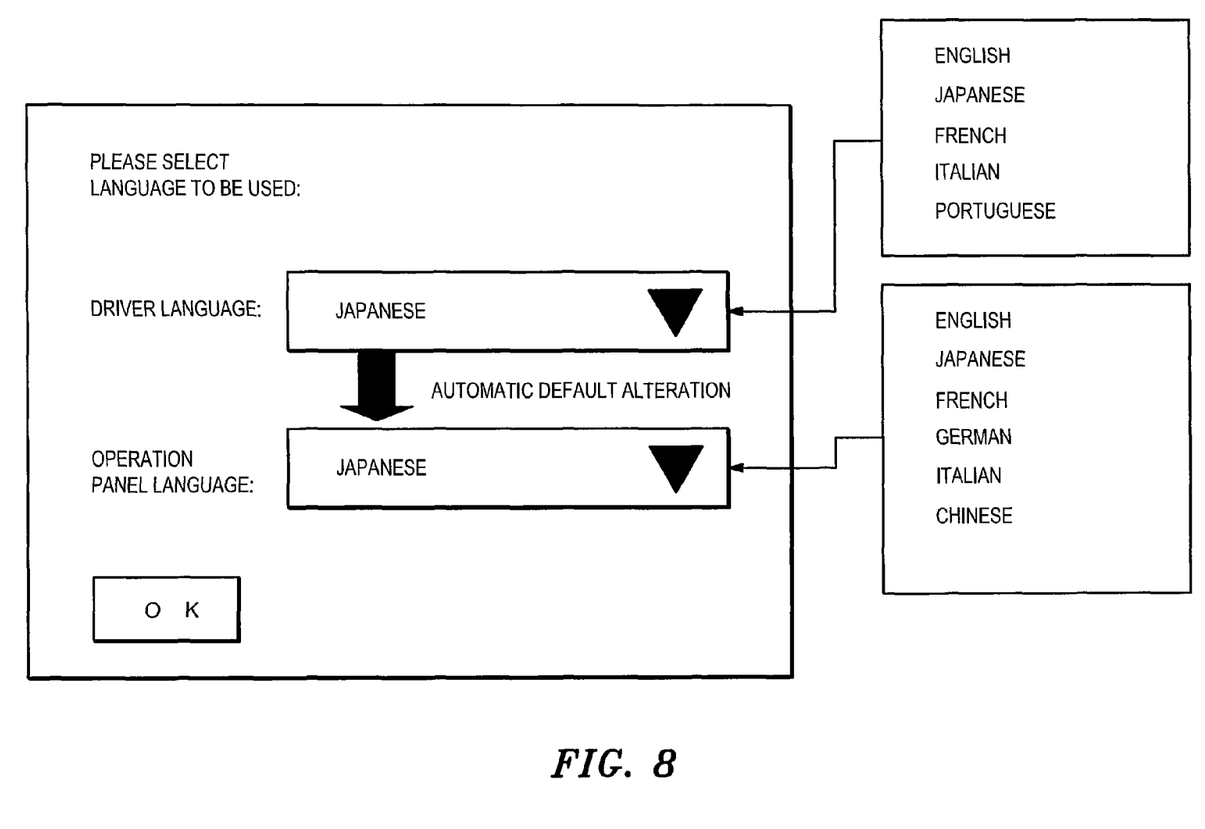
FIG. 8 is a schematic view showing language selection screen of embodiment 2 (II)

FIG. 8 is a schematic view 2 showing a language selection screen of embodiment 2 (II).

As an example, the figure shows that the panel language is altered to Japanese automatically when the user select Japanese as the driver language in Step S406.

Now return to FIG. 6 for further description.

Step S408

The panel language selecting section 311 displays a screen to set a language in the selection decision frame of operation panel language as a default, and prompts the user to select the panel language. Because the panel support language definition file 306 ash no the same language which is stored in the driver language designation information 308, the user should select other panel language.

Figure 9:
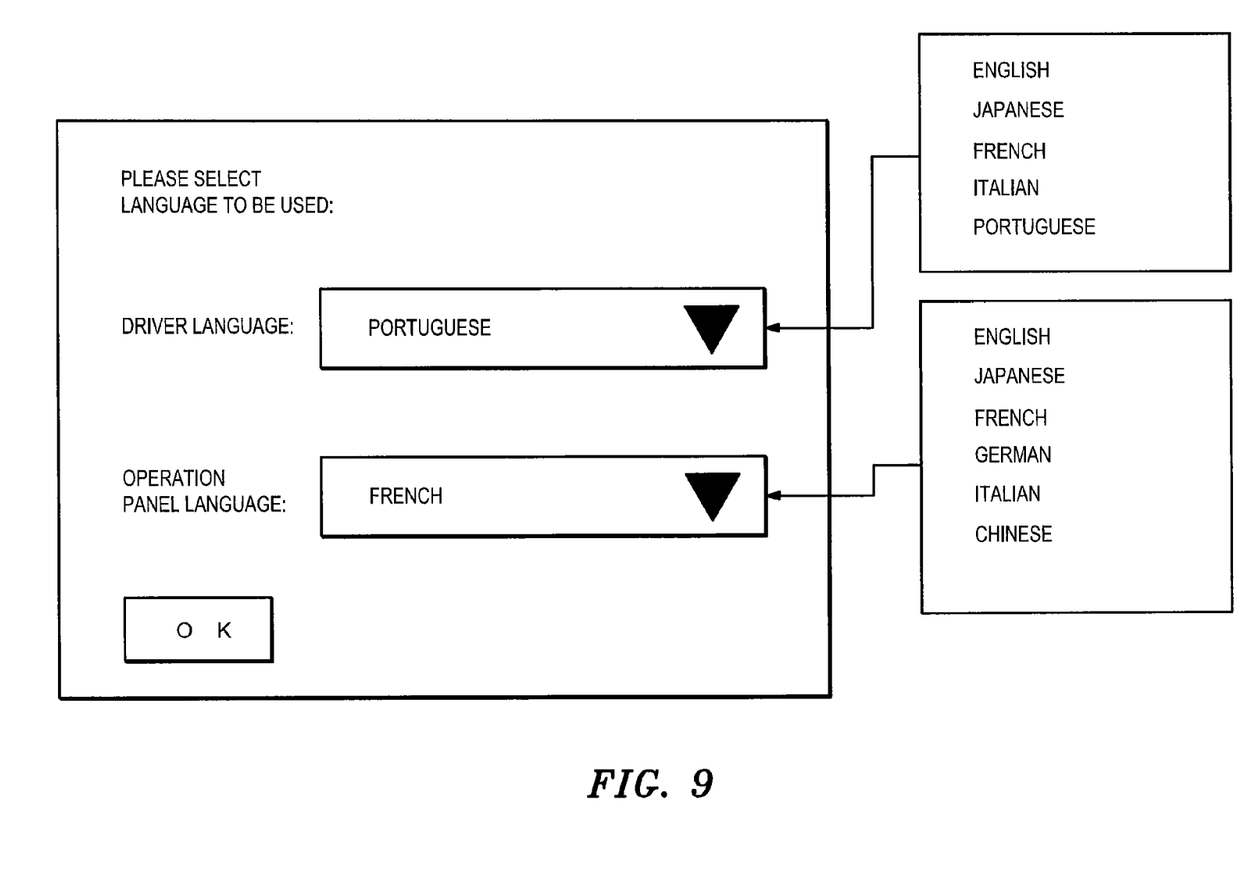
FIG. 9 is a schematic view showing language selection screen of embodiment 2 (III)

FIG. 9 is a schematic view showing a language selection screen of embodiment 2 (III).

As an example, it is assumed that the user select Portuguese as driver language in Step S406. Now the Portuguese is not stored in the panel support language definition file 306, so the panel language selecting section 311 prompts the user to select the panel language. As an example, the figure shows a state that the user selects Japanese in replace of the Portuguese. Now return to FIG. 6 for the further description.

Step S409

The panel language selecting section 311 defines the language ID of the selected language as the panel language designation information 313 after the user clicks the "OK" button displayed on the language selection screen. However, the user can alter the language through the panel language selecting section 311 on condition that discovers that the selected language through the judging section 309 is not a desirable language.

Step S410

The driver installing section 312 obtains the driver of the corresponding language from the driver storing section 314 in accordance with the information in the driver support language definition file 305 and the driver language designation information 308, and installs it to the host computer 301.

Step S411

The communicating section 315 obtains the panel language resource of the corresponding language on the basis of the information in the panel support language definition file 306 and the panel language designation information 313, and builds the panel language setting information which is provided for a language switch including the panel language resource, and sent the panel language setting information to printer 302. When the communicating section 320 of the printer 302 receives the language setting information, the panel language switching section 321 stores the panel language in the operation language storing section on the basis of the panel language setting information so as to switch the display language of the panel displaying section 323. Then the flow is over.

Figure 10:
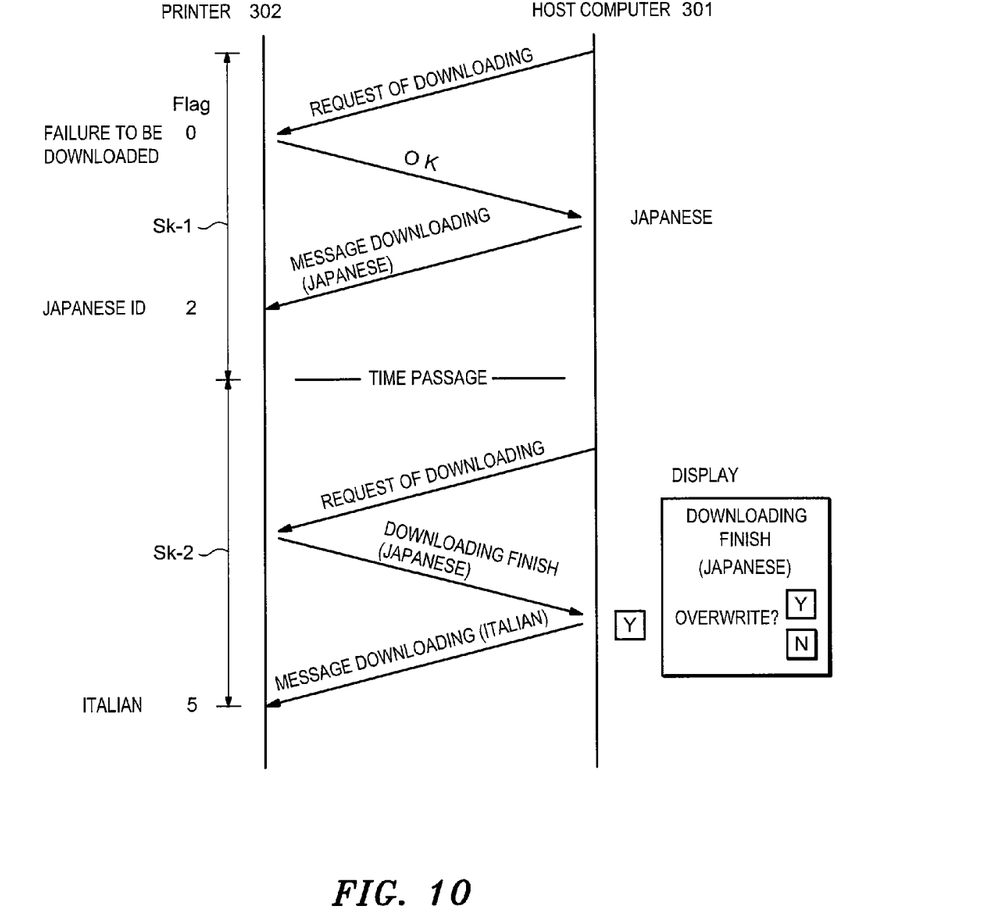
FIG. 10 is a sequence chart showing a transmission of panel data.

FIG. 10 is a sequence chart for panel data transmission.

This sequence chart makes an illustration for the summary of the information transmission performed between the host computer 301 and the printer 302 when the panel language is transmitted form the host computer 301 to the printer 302 in Step S411.

"Sk-1" indicates a sequence of initial setting. As described in the step S216 (FIG. 2) or Step S411 (FIG. 6), the host computer 301 transmits a downloading request of the panel language information to the printer 302. The printer 302 replies the information of "failure to be downloaded" (Language ID0) to the host computer 301. The host computer 301, for example, transmits a Japanese message to the printer 302. The printer 302 sets the language ID to "2" after received the Japanese message, and stores the panel language information to the panel language storing section 322. Then, the sequence is over.

"Sk-2" indicates a sequence of alteration setting. The host computer 301 transmits a loading request of panel language information to the printer 302 again. The printer 302 sends back the information of language ID2 (Japanese) to the host computer 301. At that time, as an example, the host computer 301 displays such information that the Japanese has been downloaded as the panel language, and displays such prompt information that whether to use the new panel language to overwrite the panel language in existence.

As an example, when the user wishes to select other language such as Italian as the panel language to overwrite the existing panel language and clicks the displayed "Y" button, the host computer 301 will transmit Italian to the printer 302 as the panel language. Then, the sequence is over.

Explanation of Effect:

As described above, through the installation methods and installation program mentioned in this embodiment, when the same language needs to be selected for the driver and the operation panel of the printing apparatus, on condition that the language wished by user is supported as panel language of the printing apparatus, the user only need to select the driver language of the printing apparatus, then the panel language will be altered automatically to be the most suitable option so as to avoid a complex operation of designating the language individually during installation.

The Utilization Possibility in Industry:

In the explanation of embodiments, the installation method of the present invention is applied to driver and operation panel of printing apparatus. But, the present invention is not limited in these embodiments, it can also be applied to other driver and operation panel in MFP, FAX, and other relevant apparatus. Further, the present invention is suitable not only for the installation of the driver but also for the installation of the relevant software of all the apparatus.

The present invention is not limited to the foregoing embodiment or example but many modifications and variations are possible within the spirit and scope of the appended claims of the invention.

What is claimed is:

1. A method of setting languages for functions of a printing apparatus, the method comprising:
displaying, in a single list, a plurality of languages respectively supported by at least one of a first function and a second function wherein the first function and the second function are not initially set to a particular language and the same language is not repeated;
receiving a selection of one of the plurality of languages;
determining whether the selected language is supported by the first function, the second function or both the first and the second functions, wherein:
if the selected language is supported by both the first and the second functions, then the selected language is set as a first function language and a second function language without further input of language selection being requested from a user, otherwise,
if the selected language is supported only by the first function, the selected language is set as a first function language, and further displaying in a secondary list, only languages supported by the second function and prompting to input a language selection from the user to select a second function language, and if the selected language is supported only by the second function, then the selected language is set as a second function language, and further displaying in the secondary list, only languages supported by the first function and prompting to input a language selection from the user to select a first function language.

2. The method of claim 1, wherein the first function is a printer driver and the first function language is a driver language.

3. The method of claim 2, wherein the second function is an operation panel and the second function language is a panel language.

4. The method of claim 3, wherein the plurality of languages are selected from a driver support language definition file and a panel support language definition file.

5. A language selecting system comprising:
a first function language displaying section configured to:
  (i) display, in a first list, at least two languages supported by a first function, wherein the first function is not initially set to a particular language and the same language is not repeated, and
  (ii) select one of the displayed at least two languages supported by the first function as a first function language;
a second function language displaying section configured to:
  (i) display, in a secondary list, at least two languages supported by a second function, wherein the second function is not initially set to a particular language and the same language is not repeated, and
  (ii) select one of the displayed at least two languages supported by the second function as a second function language,
wherein:
  the first function language displaying section and the second function language displaying section are simultaneously displayed, and
  if the first function language is supported by the second function, then the second function language displaying section selects the first function language and further displays as the secondary list the selected language as the second function language without further input of second function language selection being requested from a user, otherwise,
  the second function language displaying section further displays as the secondary list the at least two languages supported by the second function for selection as the second function language.

6. The system of claim 5, wherein the first function is a printer driver.

7. The system of claim 6, wherein the second function is a display panel.

8. The system of claim 7, wherein the at least two languages supported by a first function are selected from a driver support language definition file and the at least two languages supported by a second function are selected from a panel support language definition file.

* * * * *